United States Patent [19]

Kock

[11] 4,255,346

[45] Mar. 10, 1981

[54] PRODUCTION OF AN EDIBLE OIL FROM CRUDE SOY OIL

[75] Inventor: Manfred Kock, Emmerich, Fed. Rep. of Germany

[73] Assignee: Akzo N.V., Arnhem, Netherlands

[21] Appl. No.: 904,397

[22] Filed: May 10, 1978

[51] Int. Cl.[3] .......... C09F 5/02; C11B 1/10

[52] U.S. Cl. .......... 260/412.4; 260/412.8; 260/428.5

[58] Field of Search .......... 260/412.4, 412.8, 428.5

[56] References Cited

U.S. PATENT DOCUMENTS

| | | | |
|---|---|---|---|
| 2,629,722 | 2/1953 | Dunning | 260/412.4 |
| 2,802,849 | 8/1957 | Passino | 260/428.5 |
| 3,786,078 | 1/1974 | Finley | 260/412.4 |
| 4,045,879 | 9/1977 | Witte | 260/412.4 |

*Primary Examiner*—John F. Niebling

[57] ABSTRACT

Production of edible soybean oil from raw soybean oil extracted from soybeans by first moistening soybean flakes to raise their water content to 12 to 25% by weight and subjecting the moistened flakes to heat treatment at 90° to 120° C. and thereafter extracting crude soybean oil from the treated flakes with a non-polar solvent; subjecting the crude soybean oil, after removal of lecithin therefrom, to bleaching without a separate desliming step; and thereafter deodorizing with simultaneous deacidizing the bleached soybean oil.

10 Claims, No Drawings

PRODUCTION OF AN EDIBLE OIL FROM CRUDE SOY OIL

The invention relates to a method for producing edible oil from raw soybean oil as it is obtained by solvent extraction from soybeans after the separation of the solvent.

For the production of soybean oil for food purposes the extracted, raw soybean oil is delecithinized first by hydration. Subsequently the soybean oil is refined and finally subject to deodorization with steam at temperatures of 180° to 270° C. under vacuum. The free fatty acids present in the oil are distilled off in the steam. Up to now, different refining methods were used. One method consists of a treatment of the oil with approximately 10 to 20% aqueous soda lye and subsequent bleaching with fuller's earth. Before the treatment with soda lye, however, there can also be an additional acid desliming stage, in which the desliming is usually carried out with concentrated phosphoric acid. In this stage the removal of the phospholipids, of the compounds containing protein and sugar, and of the mechanical impurities is achieved. This stage facilitates quite considerably the treatment with the lye solution in which the free fatty acids are converted into soaps and are separated from the oil in form of soap stock—a concentrated watery soap solution. The formed soaps have an emulsifying effect, however, and take up part of the valuable, neutral soybean oil. Up to now, the prevailing opinion was that, for phosphatide-containing vegetable oils, for instance, soybean oil, removal of fatty acids by the lye treatment is necessary, especially since the undesirable components, which make difficult the subsequent deodorization and which were not removed in the acid desliming, are retained in the soap stock, which is separated from the oil by centrifuging.

However, the use of lye solutions necessitates saponification of the soybean oil triglycerides. Such saponification, in addition to the neutral oil emulsified in the soap stock, leads to a further loss of yield of the refined soybean oil.

To avoid these disadvantages, it has been proposed in German Published Application 1 214 818 to forgo the treatment with the lye solution and to refine the raw oil by treating it with a mixture of an acid, for instance, sulfuric acid, phosphoric acid, hydrochloric acid, etc., and an emulsifier. The treatment with the emulsifier/acid mixture can also be carried out in the presence of fuller's earth. Deacidizing takes place simultaneously with the deodorizing by treating the oil with steam under vacuum at a high temperature.

It is true, by this well known method, the lye treatment is eliminated and the number of process steps is reduced, but by means of this method one does not succeed in producing soybean oil for edible purposes which, besides a light color, good resistance to oxidation and thereby good keeping quality, has the required neutral taste.

It is the objective of the present invention to provide a process, consisting of as few steps as possible, for the production of soybean oil for food purposes which fulfills all quality demands made of an edible oil—such as taste, color and keeping quality—and free from foreign substances and/or undesirable components.

This objective is achieved by a method characterized by moistening the not yet extracted soybeans to a water content of 12 to 25 weight percent, by subjecting the moistened soybean pieces to a heat treatment at temperatures of 90° to 120° C., by subsequently extracting the raw soybean oil from the treated material by means of a non-polar solvent and, without a separate desliming stage, by subjecting the soybean oil, after it is delecithinized in the well known manner, to a bleaching process and subsequently, as known, by deodorizing it with simultaneous deacidizing, e.g. by steam distillation.

Raw or crude soybean oil in the context of the invention is understood to be soybean oil obtained from the extraction of the soybeans and after the removal of the solvent. The removal of the solvent can take place according to any of the common procedures heretofore used. The same is true for the subsequent delecithinizing which have very good yields of lecithin, if soybean oil derived by the processes of the invention is used.

The unextracted soy material, e.g., pieces of crushed soybeans which preferably are flattened into flakes by rolling, is moistened to a water content of 12 to 25, preferably 14 to 20, weight percent and the temperature for the heat treatment is 90° to 120° C., preferably 95° to 110° C. Drying is carried out to the extent that the usual water content, which is between 8 and 14 weight percent, is reached.

Moistening and treatment is appropriately carried out in a tower which has plates with steam coils at several levels. The upper entry portion may be provided with means for moistening the beans.

Good results are obtained especially if, contrary to the prevailing opinion, the soybeans are mechanically moved during the moistening and/or the heat treatment until a bulk weight of at least 400 kg/$m^3$, preferably over 500 kg/$m^3$, is reached, and the soy material having such high bulk weight is used for the extraction of the oil. For this purpose, stirring paddles can be installed in the mentioned tower which move the soy material along the plates in the tiers, to openings in the plates. The soy material drops to the next lower level by way of tubes or the like.

In a preferred form of the invention, hydrocarbons containing 5 to 12 carbon atoms in the molecule are used singly or in a mixture as extraction agents. Technically pure pentane, hexane, cyclohexane, heptane, nonane, octane and light benzine having a boiling range of 65° to 85° C. are examples of such hydrocarbons, which can be used. It proved to be advantageous to carry out the moistening and the heat treatment with small flakes rolled out in the crushing mills because then a treatment time of 10–45 minutes is sufficient for the heat treatment. Moistening appropriately takes place with steam which is blown directly on the material (e.g. flakes). The steam, on the one hand, heats the soy material to the temperatures of the heat treatment and, on the other hand, moistens it with its water of condensation in the desired manner.

The bleaching of the extracted soybean oil is carried out with adsorptive substances, singly or in a mixture, in a manner known per se. Natural earths, such as fuller's earth, acid-activated earths, activated carbon and silica gel are examples of such substances. With regard to the techniques of the usual bleaching processes, reference is made to the pertinent literature (for instance, J. Amer. Oil Chemists' Soc. 35, p. 76 ff. 1958).

By the moistening and heat treatment of the crushed soybeans before the extraction of the soybean oil, there is obtained a soybean oil which, after the delecithinization, need be subjected only to the usual bleaching with fuller's earth or with other adsorptive substances in order to be ready for deodorization without any disadvantage from omitting the desliming step. In the deodorization, the free fatty acids are also removed by steam distillation without any additional splitting off or saponification of the fatty acids of the neutral soybean oil. The edible oil recovered from the deodorizer has a light color and an entirely neutral taste. The bitter, seedlike aftertaste, which is common in soybean oil where desliming was ineffectively carried out, was absent in the soybean oil in accord with the invention even though essential processing steps, which had been regarded as absolutely necessary up to now, were omitted.

Deodorization, which simultaneously has a deacidizing effect, is conducted in the well known manner (Chemiker Zeitung 88, 1964, pp. 412 ff.), for instance, by steam distillation under vacuum.

A preferred embodiment of the invention is set forth in the example below.

EXAMPLE

After the usual preliminary cleaning, such as sieving and sifting, in order to remove foreign substances, soybeans were ground on grooved rollers and subsequently rolled on smooth rollers on which the ground bean pieces were flattened into small flakes having a diameter of approximately 0.22 mm. By direct application of steam, the soy flakes prepared in this manner were moistened at the rate of production, approximately 400 tons per day, to a water content of 17 weight percent with the flakes under constant mechanical movement in a fast paddle mixer (400 r.p.m.) and subsequently transferred to a tower which on several levels contained trays with steam coils. The moistened soy flakes were heated to temperatures of approximately 105° C. By means of slowly rotating stirring paddles, the soy flakes were moved on each level as they progressively moved downwardly through the respective levels in the tower. The flakes were dried to a moisture content of 11% prior to extraction. The time of stay in the tower was approximately 35 minutes, and the dried flakes used in the extraction had a bulk weight of 400 kg/m³.

On a belt extractor, the soy flakes were extracted with technical hexane to an oil residue content of the flakes of approximately 1%. The entire extraction time took about half an hour.

The technical hexane was distilled off from the extracted soybean oil in a multistage process. The crude soybean oil obtained in this manner had a phosphatide content of 3.8%.

This crude soybean oil was delecithinized in the usual manner by hydrating the lecithin contained therein with 3% water at 80° C. The lecithin mucilage obtained in this operation was separated from the oil by means of centrifuges. After the evaporation of the water from the lecithin mucilage in a lecithin dryer, a yield of 1.2% soy lecithin, with reference to the charged weight of soybeans, was obtained.

The delecithinized soybean oil obtained in this manner was bleached by treatment in a vacuum with 0.8 weight percent fuller's earth of the type Tonsil Optimum FF of the Süd-Chemie company. After filtering off the fuller's earth, a bleached soybean oil was obtained having the following characteristic numbers:

| | |
|---|---|
| acid number | 0.8 |
| color number (according to Gardner) | 4 |
| phosphatide content | 0.005% |

This oil was steamed in a semi-continuous steamer at a temperature of 240° C. and simultaneously deacidized by steam distillation. The edible soybean oil obtained in this manner had the following characteristic numbers:

| | |
|---|---|
| color number (according to Gardner) | 1 |
| acid number | 0.09 |
| phosphatide content | 0.003% |
| taste grade | 8 |
| stability of taste in 1000 Lux test[1] | 10 days |
| Swift Text 100° C.[2] | 7.5 hours |

[1]Pardun and Kroll: Deutsche Lebensmittel-Rundschau 68 (1972) 245
[2]Hadorn and Zurcher: Deutsche Lebensmittel-Rundschau 70 (1974) 57

These characteristic numbers correspond in all points to the demands which are made on a qualitatively high-grade edible soybean oil.

Soybean oil obtained according to the usual method (without moistening and heat treatment before the extraction) was also bleached with 0.8% fuller's earth of the type Tonsil Optimum FF and subsequently filtered.

After the bleaching, this oil had the following characteristic numbers:

| | |
|---|---|
| acid number | 0.8 |
| color number (according to Gardner) | 5 |
| phosphatide content | 0.38% |

This oil was deodorized in the same deodorization plant and simultaneously deacidized by steam distillation. The recovered soybean oil has an unpleasant taste and odor and therefor could not be used as an edible oil.

The process herein departs from the previously known processes chiefly by the moistening of the soybean pieces to raise their water content to 12–25% by weight, preferably 14–20% by weight and subjecting the moistened pieces to heat treatment at 90° to 120° C., preferably 95° to 110° C., for a period of about 10 minutes to about 90 minutes, preferably about 10 minutes to 45 minutes in the case of heat treating of soybean flakes. The heat treatment and moistening may be carried out in a common zone by exposing the soybean pieces to steam, preferably while the pieces are mechanically agitated, until the pieces are heated to 90° to 120° C. The condensed steam supplies take moisture in this instance. In a separate moistening step, the pieces may be moistened by steam or may be immersed in or sprayed with water to attain the requisite moisture increase, after which they are heat treated.

In the foregoing Example, the soybean flakes were moistened in the paddle mixer by the direct application of steam. Substantially all of the heat treatment and the drying of the moistened flakes to their indicated moisture content took place as the soy flakes moved downwardly through the tower.

The invention is hereby claimed as follows:

1. A method for producing an edible soybean oil which comprises moistening soybean pieces in the form of crushed and rolled flakes to raise their water content to 12 to 25% by weight and subjecting the moistened flakes to a heat treatment at temperatures in the range of 90° to 120° C. accompanied by a compacting mechanical movement of said flakes sufficient to reach a minimum bulk weight thereof of at least about 400 kg/m$^3$, subsequently extracting crude soybean oil from said flakes with a non-polar solvent, removing licithin from the crude soybean oil, bleaching the resultant delecithinized oil, and, directly after the bleaching and without a separate desliming step, simultaneously deodorizing and deacidizing the delecithinized crude soybean oil to obtain edible soybean oil free from bitter taste.

2. A method as claimed in claim 1 wherein the water content of the moistened soybean flakes is raised to 14 to 20% by weight.

3. A method as claimed in claim 1, wherein the heat treatment temperature is in the range of 95° to 110° C.

4. A method as claimed in claim 1 wherein said non-polar solvent used in the extraction is one or more hydrocarbons having 5 to 12 carbon atoms.

5. A method as claimed in claim 1 wherein said soybean flakes are moistened by direct application of steam.

6. A method as claimed in claim 1 wherein the bleaching of the crude soybean oil is carried out with one or more adsorptive materials.

7. A method as claimed in claim 6 wherein said absorptive materials are selected from the group consisting of natural earths, acid-activated earths, activated carbon and silica gel.

8. A method as claimed in claim 1 wherein said mechanical movement together with said moistening and said heat treatment is sufficient to raise the bulk weight of said flakes to a minimum value of at least about 500 kg/m$^3$.

9. A method as claimed in claim 1, 2 or 8 wherein said flakes upon completion of the heat treatment and mechanical movement are dried to a moisture content of about 8 to 14% by weight.

10. A method as claimed in claim 1, 2 or 8 wherein said heat treatment is carried out for a period of time of about 10 to 45 minutes.

* * * * *

UNITED STATES PATENT AND TRADEMARK OFFICE
CERTIFICATE OF CORRECTION

PATENT NO. : 4,255,346
DATED : March 10, 1981
INVENTOR(S) : Manfred Kock

It is certified that error appears in the above-identified patent and that said Letters Patent are hereby corrected as shown below:

On the front page of the patent, insert the following:

[30] Foreign Application Priority Data
May 17, 1977 [DE] Fed. Rep. of Germany 2722245

Signed and Sealed this

Twentieth Day of October 1981

[SEAL]

*Attest:*

GERALD J. MOSSINGHOFF

*Attesting Officer* *Commissioner of Patents and Trademarks*